United States Patent [19]
Campbell

[11] Patent Number: 5,390,887
[45] Date of Patent: Feb. 21, 1995

[54] ADJUSTABLE BEVERAGE CONTAINER HOLDER FOR USE IN VEHICLES

[76] Inventor: Kirby K. Campbell, 6880 Mullan Rd., Missoula, Mont. 59802

[21] Appl. No.: 231,505

[22] Filed: Apr. 22, 1994

Related U.S. Application Data

[63] Continuation-in-part of Ser. No. 69,764, Jun. 1, 1993, abandoned, which is a continuation-in-part of Ser. No. 841,333, Feb. 25, 1992, abandoned.

[51] Int. Cl.$^6$ .............................................. A47K 1/08
[52] U.S. Cl. .................................. 248/311.2; 224/901; 224/42.32; 248/205.2; 248/310; 248/146
[58] Field of Search .................... 248/146, 311.2, 310, 248/313, 205.2; 224/901, 42.42, 42.32, 42.45 R

[56] References Cited

U.S. PATENT DOCUMENTS

| | | |
|---|---|---|
| 1,326,086 | 12/1919 | Ormandy . |
| 3,104,040 | 9/1963 | Stevens . |
| 3,357,614 | 12/1967 | Berg . |
| 3,565,384 | 2/1971 | Lockwood ...................... 248/146 X |
| 3,771,754 | 11/1973 | Swartz . |
| 3,805,988 | 4/1974 | Walker ............................ 248/146 X |
| 4,678,154 | 7/1987 | McFarland ...................... 248/311.2 |
| 4,767,092 | 8/1988 | Weatherly ...................... 248/311.2 |
| 4,821,731 | 4/1988 | Johnson ........................... 248/901 X |
| 4,846,382 | 7/1989 | Foultner et al. ................ 248/901 X |
| 4,852,843 | 8/1989 | Chandler . |
| 4,915,337 | 4/1990 | Iwasaki . |
| 4,919,381 | 4/1990 | Buist . |
| 4,928,873 | 5/1990 | Johnson ....................... 248/311.2 X |
| 4,951,910 | 8/1990 | March . |

Primary Examiner—Blair M. Johnson
Attorney, Agent, or Firm—Keith S. Bergman

[57] ABSTRACT

An adjustable holder for use in a vehicle to positionally maintain variably sized beverage containers. The holder provides a flat base carrying two upstanding spacedly opposed columns defining a slot therebetween to allow passage of a cup handle therethrough. Each column carries a flexible, circumferentially extending support arm that partially encircle a cylindrical beverage container in opposite directions to overlap and releasably fasten to each other in their outer end parts, in a first species by hook and loop type fabric fastening structure carried on adjacent support arm surfaces and in a second species by a ratchet type fastener. The base of the holder is releasably fastenable on a carpeted surface for positional maintenance by four radially extendible carpet hooks that are biased inwardly by an elastic member interconnecting all hooks. The bottom surface of the base also provides hook and loop type fasteners for optional fastening on solid surfaces such as a dashboard or center console.

8 Claims, 4 Drawing Sheets

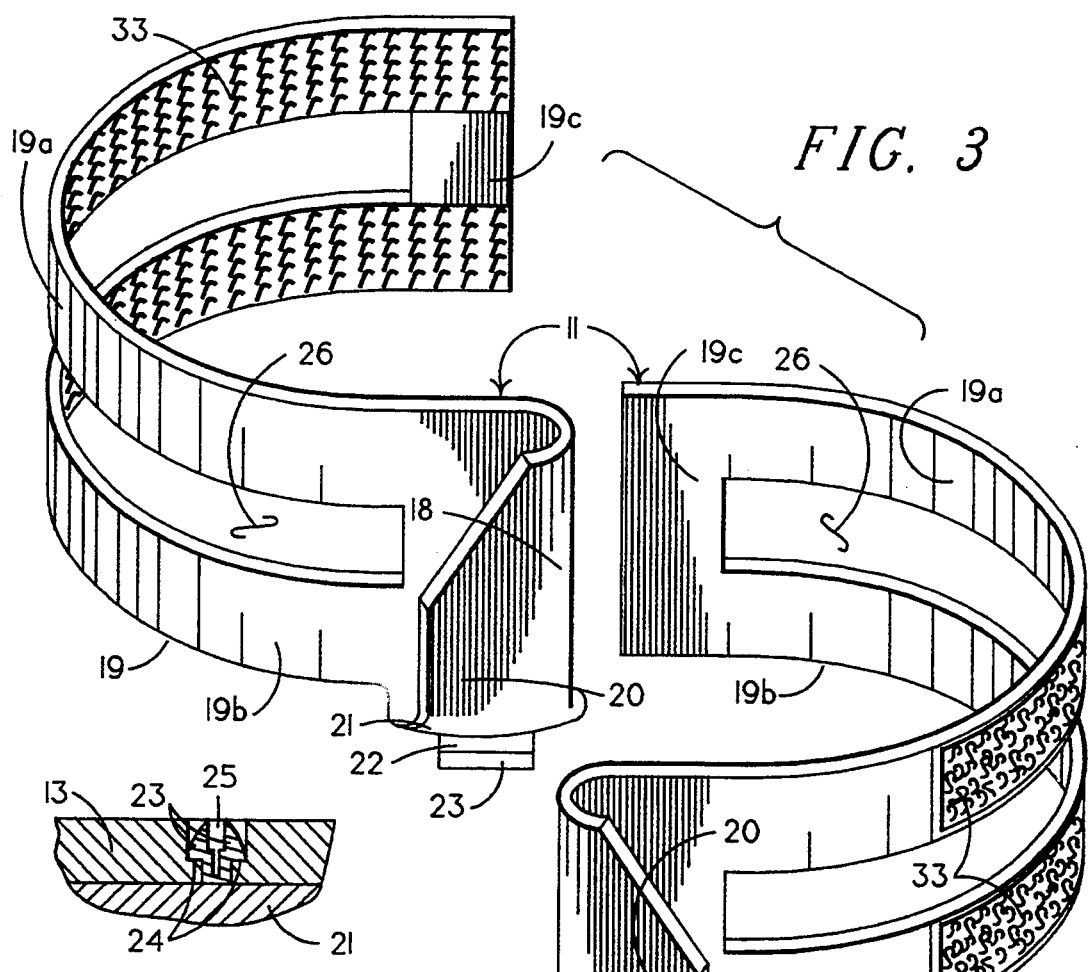
FIG. 3
FIG. 6
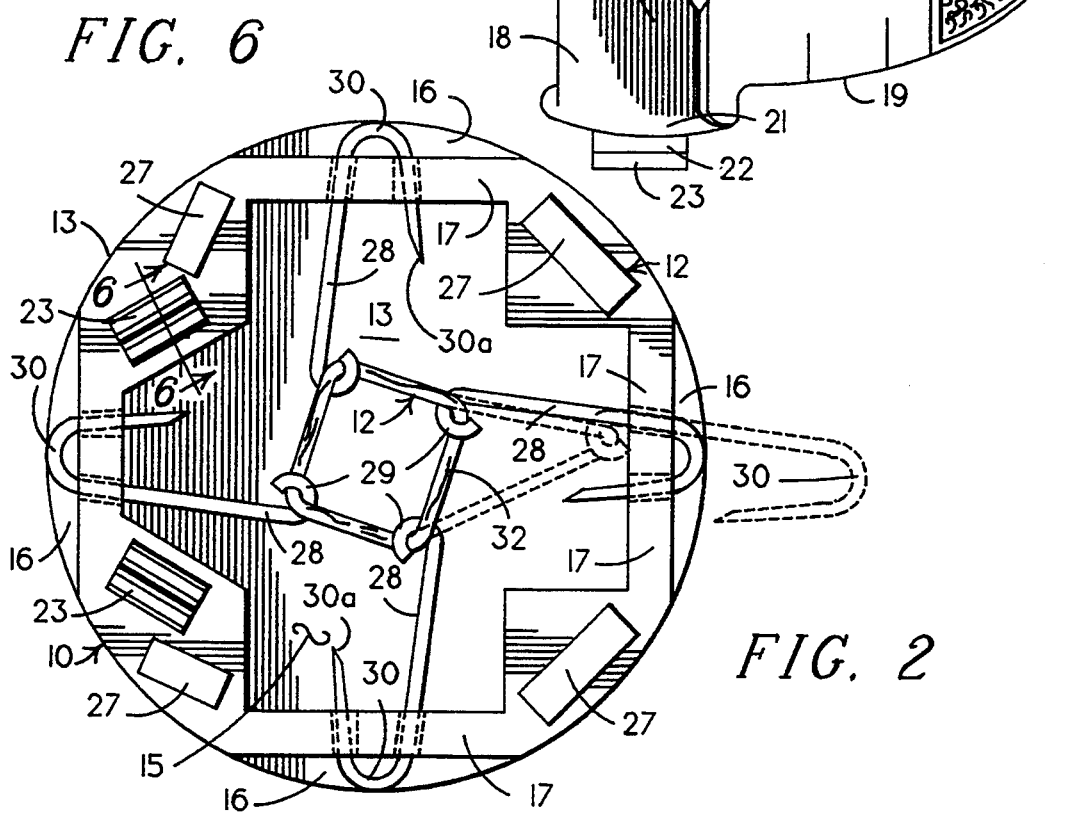
FIG. 2

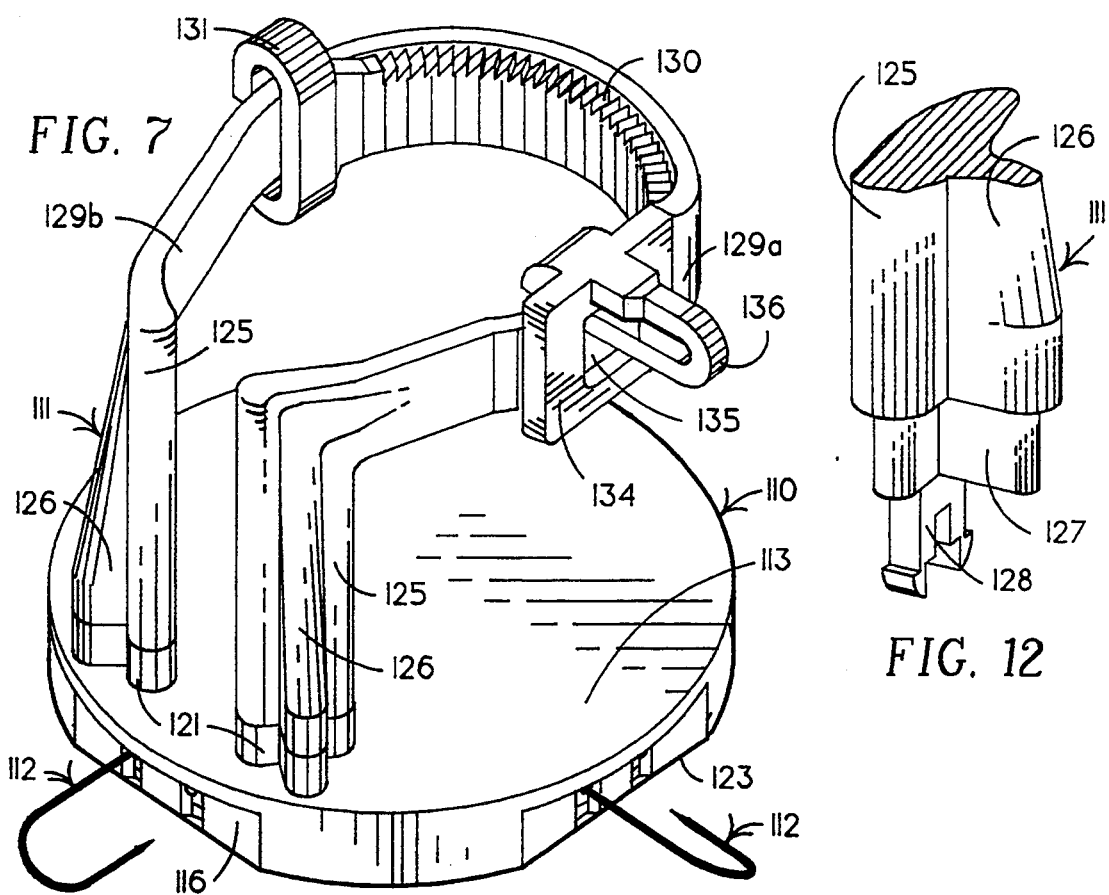
FIG. 7
FIG. 12
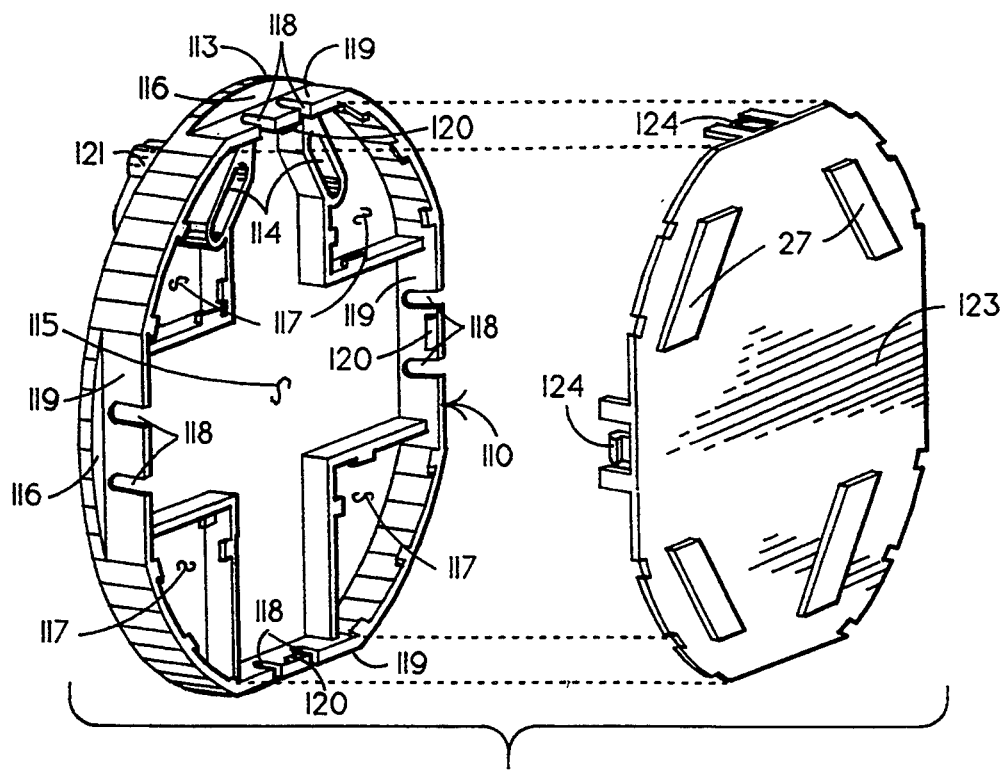
FIG. 11

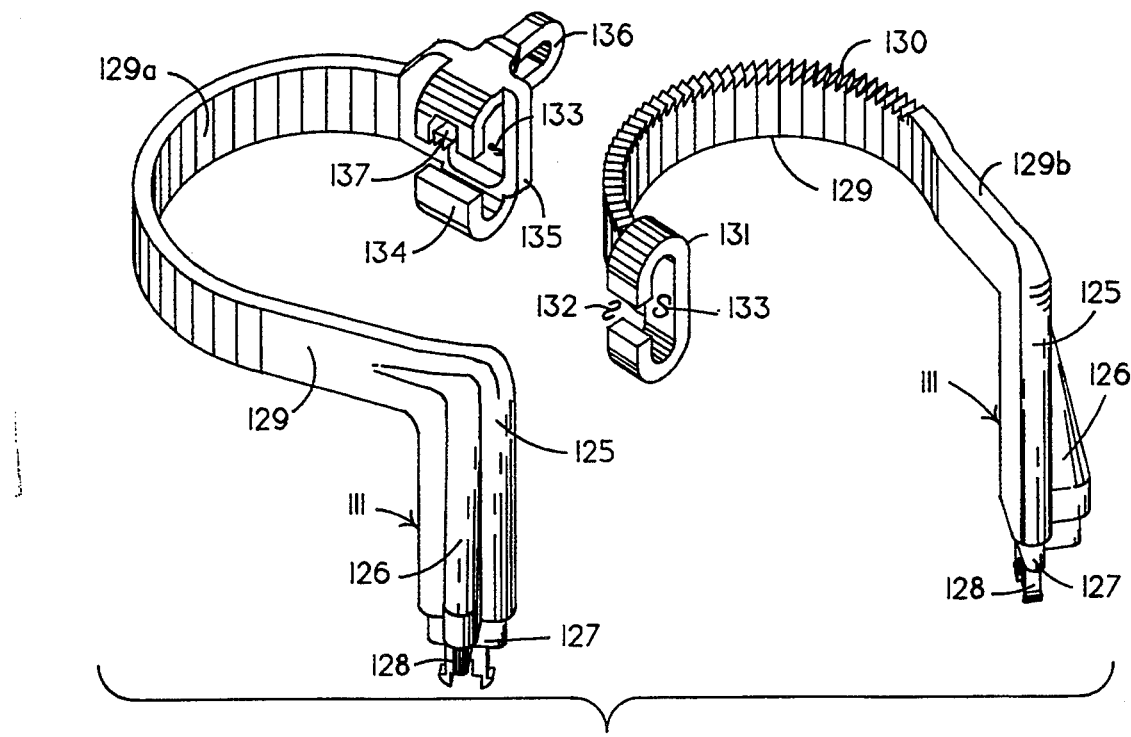
FIG. 9
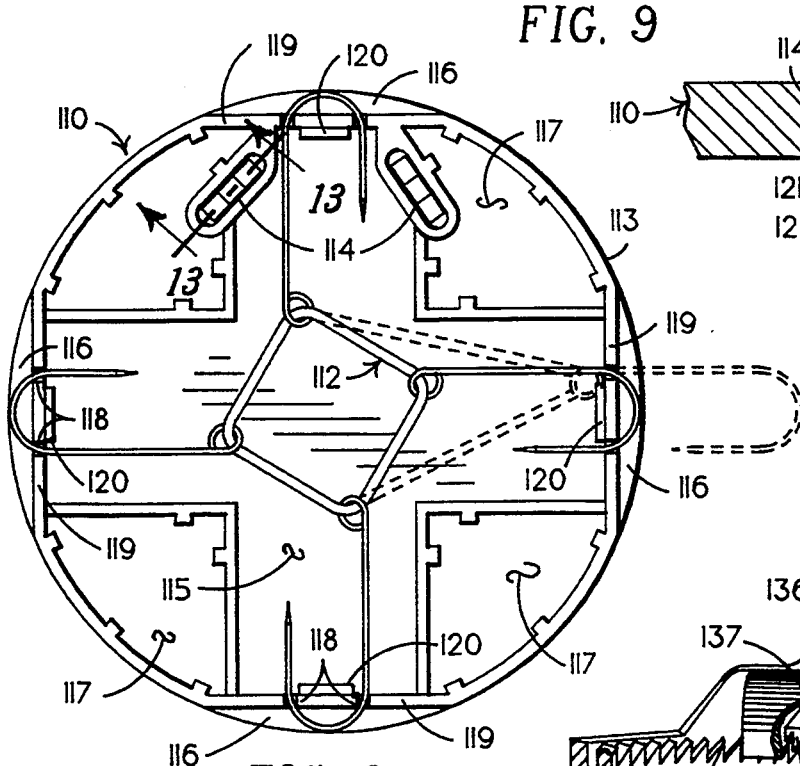
FIG. 8
FIG. 13
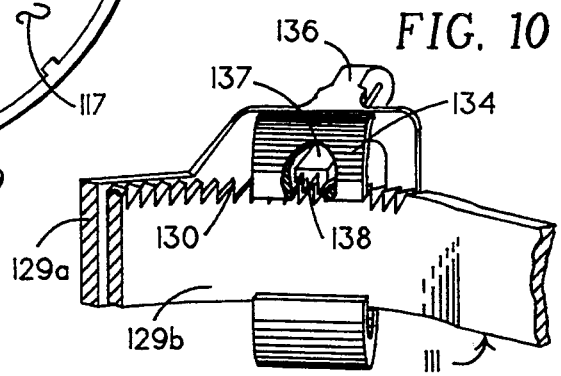
FIG. 10

ADJUSTABLE BEVERAGE CONTAINER HOLDER FOR USE IN VEHICLES

RELATED APPLICATIONS

This is a continuation-in-part of an application filed Jun. 1, 1993, Ser. No. 08/069,764, now abandoned, which was a continuation-in-part of an application filed Feb. 25, 1992, Ser. No. 07/841,333, now abandoned.

BACKGROUND OF INVENTION

1. Field of Invention

This invention relates to holders for beverage containers for use in vehicles and more particularly to such a holder with flexible, interconnectable arms encircling the container and a base selectively securable to either a carpeted or smooth rigid surface.

2. Background and Description of Prior Art

Holders for beverage containers of various sorts have long been known and have increased substantially in their sophistication during the course of their development, until at the present time various types of beverage holders are readily distinguishable by reason of their specialized features that adapt them for particular uses. One class of such devices has developed for containment and support of beverage containers in automotive vehicles. My invention provides a new and novel member of this class of holders.

Holders for support of beverage containers in vehicles must generally be supported on the vehicle structure so that they maintain positional stability when the various forces generated by normal vehicular activity are applied to the holders and their fluidic contents. This requires firstly, that the holder itself must be positionally maintained on some part of the interior surface of a vehicle, preferably in a releasable fashion, and secondly, that a beverage container that is supported must be positionally maintained in the holder in a releasable but yet secure fashion to prevent container motion or spillage of contents. Additionally, to have any substantial utility, such a holder must be adaptable to hold beverage containers of various sizes and shapes that are commonly available in the present day marketplace. Prior art devices have not well addressed or solved these problems which are resolved in a new and novel fashion by my holder.

To maintain a beverage container in s secure fashion, my holder provides a flat base supporting two spacedly adjacent upstanding support columns, each carrying an elongate, flexible band that encircles more than half of a beverage container so that the outer ends of both bands may be releasably joined to each other by releasable fasteners to secure a container in the holder. This structure allows adjustment for use with containers of different size and differently configured pheripheries, while yet maintaining such containers in a secure fashion. The structure also allows the encircling arms to be positioned at a substantial height above the base and to have a substantial vertical extent, even as great as that of a beverage container to be held, so as to better and more certainly support a container against tipping forces and lessen sloshing motion of liquid beverages in a container which might cause spillage and enhance tipping. With this arm structure, its size may be once adjusted for a particular beverage container and that container thereafter removed from and placed within my holder without further adjustment. If desired, the inner surface of the holding arms may carry adhesive elements to further enhance the gripping action of the support arms on beverage containers.

To provide positional maintenance on a vehicle surface, the bottom of my holder provides adhesive fasteners which may be attached to solid rigid surfaces of a vehicle such as dashboard or center console, and also a hook structure to maintain the holder on a carpeted surface. The hook structure comprises a plurality of radially arrayed hooks, each elastically fastened in its inner portion but extendible from the base to fasten into the nap of a carpeted surface adjacent the base periphery. This structure is distinguishable from prior hook type fastening structures by reason of the symmetrical hook array which, when combined with symmetrical biasing forces, tends to positionally maintain the holder over a particular area to provide more and better positional security than non-symmetrical hook fastening systems.

My invention is further distinguished from prior holders by reason of the combination of two position maintaining systems that adapt the holder for selective use on either a smooth rigid support or a carpet nap.

To alleviate the problems of supporting both cylindrical containers and also cup-like containers that have a handle protuberance extending normally from their surface, my holder provides a construction that defines a vertically orientated slot between the vertically extending support columns. This construction allows protuberances such as a cup handle to be carried within the slot while the remaining cylindrical portion of the beverage holder is supported in the fashion described to maintain a handled container in as secure a fashion as a cylindrical container. The particular structure of the upstanding support columns allows formation of each column, which is a mirror image of the other, in a separate releasably attachable fashion so as to make the entire holder readily formable by present day plastic molding processes without requiring complete and expensive one-piece molds, while yet providing the durability, strength and rigidity of a device formed as a unitary structure.

My invention resides not in anyone of these features per se, but rather in the synergistic combination of all of the structures of my holder that necessarily give rise to the functions flowing therefrom as herein specified and claimed.

SUMMARY OF INVENTION

My beverage container holder provides a rigid base supporting an upstanding support structure that encircles a portion of a beverage container and having fastening means on its lower surface for positional maintenance on either a smooth rigid or carpeted surface of a vehicle. The upstanding support structure provides two spacedly adjacent vertical columns extending upward from and supported by the base to define a cup handle slot therebetween. Each column carries a flexibly resilient, arcuate fastening arm extending horizontally therefrom to overlap with a similar arm carried by the other column at a point diametrically opposite the slot between the vertical columns. Each support arm provides fastening means to releasably fasten the overlapping portions of both arms in adjustable supporting relationship about a beverage container. A first species of fastening means provides hook and loop fasteners on adjacent support arm surfaces and a second species provides fastenably engageable cooperating ratchet teeth in both support arms.

The undersurface of the base carries co-planar hook and loop fasteners for attachment to a smooth rigid vehicle surface for positional maintenance. The base also carries plural carpet hooks in radially extensible symmetric array, with shanks interconnected by an elastic element extending therebetween to bias the hooks to a radial inward position but allow their extension in a radial direction against their bias to fasten in a carpeted surface spacedly adjacent the periphery of the base to positionally maintain the holder.

In creating such a beverage container holder it is:

A principal object to provide such a holder that may be releasably supported on a somewhat horizontal surface in a vehicle to hold and positionally maintain an open beverage container during vehicle transit.

A further object is to provide such a holder with two spacedly adjacent upstanding columns that define a slot therebetween to allow passage of the handle of a cup so that containers having protruding handles may be as securely held as completely cylindrical beverage containers.

A further object is to provide such a holder that has two similar horizontally extending, flexible holding arms that extend from the spaced columns to encircle a beverage container and are releasably fastenable to each other to securely support beverage containers of varying size and shapes in the holder.

A further object is to provide such a holder that has hook and loop type fasteners, one element of which may be fastened to a smooth rigid surface of a vehicle such as a dashboard or a center console to positionally maintain the holder thereon.

A still further object is to provide such a holder that has plural carpet hooks, biased to a radially inward position, but movable radially outwardly against their bias to fasten in carpet spacedly adjacent the periphery of the base for positional maintenance of the holder.

A still further object is to provide such a holder that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement, with only preferred and practical embodiments of the best known mode of my holder being illustrated in the accompanying drawings and described in the following specification, as is required.

BRIEF DESCRIPTION OF DRAWINGS

In the accompanying drawings which form a part hereof like numbers of reference refer to similar parts throughout:

FIG. 2 is an orthographic bottom view of the base of the bolder of FIG. 1.

FIG. 3 is an expanded isometric view of the support arms, removed from the base structure for clarity of illustration.

FIG. 6 is a partial cross-sectional view through the interconnection of a vertical column with the base, taken on the line 6—6 of FIG. 2 in the direction indicated by the arrows thereon.

FIG. 7 is an isometric surface view of a second species of my beverage holder that releasably interconnects support arms by means of tooth-type connecting structure.

FIG. 8 is a bottom view of the internal structure of the base of the bolder of FIG. 7 with the bottom plate removed.

FIG. 9 is an expanded isometric view of the support arms of the bolder of FIG. 7, removed from the other holder structure.

FIG. 10 is an orthographic view of the toothed fastening structure of the holder of FIG. 7, viewed from the inside looking outwardly.

FIG. 11 is an expanded isometric view of the base of the device of FIG. 7 with the bottom plate and fastening structure removed.

FIG. 12 is an isometric view of the foot of a vertical column of the holder of FIG. 7, showing the fastening means that interconnect with the base structure.

FIG. 13 is a partial cross-sectional view, taken on the line 13—13 of FIG. 8 in the direction indicated by the arrows to show the interconnection of the column fastener with the base.

DESCRIPTION OF THE PREFERRED EMBODIMENT

My beverage container holder generally provides rigid base 10 carrying upstanding support structure 11 and defining holding structure 12 carried by its base for positional maintenance on a vehicle surface.

Figure 1:
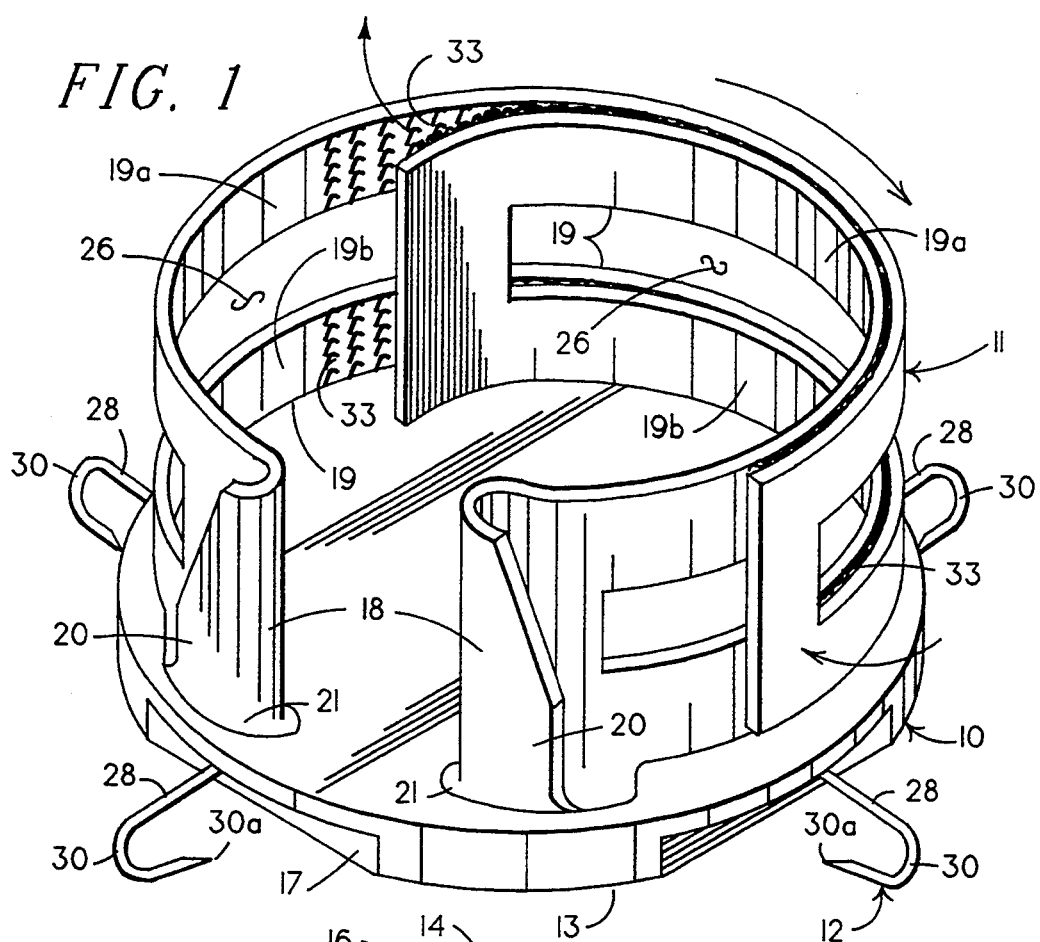
FIG. 1 is an isometric surface view of a first species of my beverage container holder with hook and loop fasteners interconnecting the support arms, showing its parts, their configuration and relationship.
Figure 4:
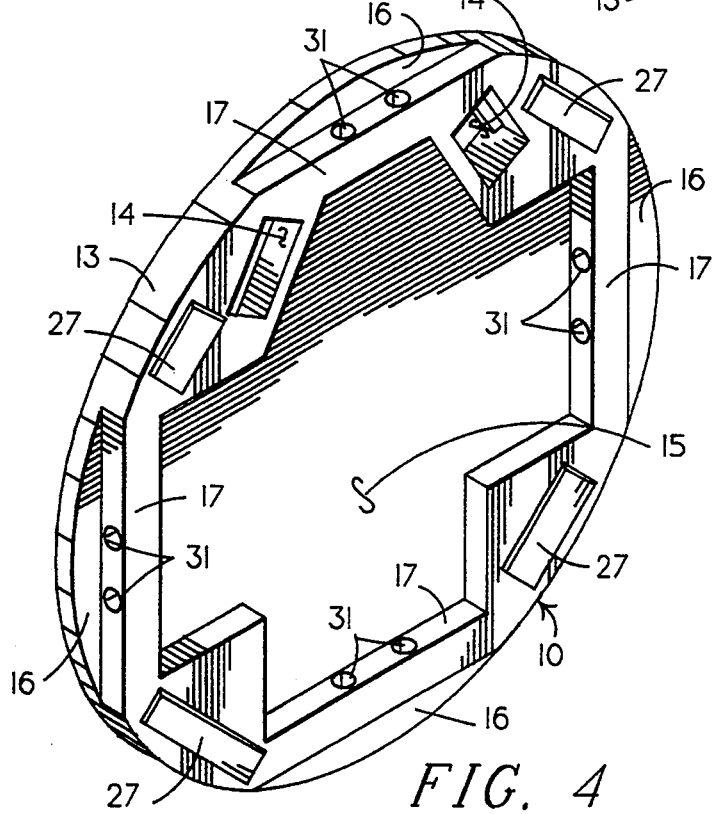
FIG. 4 is an isometric view of the bottom of the base, with carpet hook fastening structures removed.

In the first species of FIGS. 1–6, base 10 comprises flat rigid disk 13 having a planar upper surface and circular periphery. The disk defines two spacedly adjacent fastening holes 14 extending vertically therethrough inwardly adjacent its periphery, each hole being configured to receive a support foot fastener of the support structure 11. The bottom or undersurface of the base defines a medial indentation 15 to receive and carry hook-type carpet fastening elements and four symmetrically arrayed segmental indentations 16 extending inwardly from its periphery. The indentations 15, 16 are arranged and configured as illustrated in FIGS. 2 and 4 to define between the medial and segmental indentations relatively narrow bridges 17 which define cooperating pairs of spaced rug hook holes 31 communicating between two spacedly adjacent indentations. The remaining bottom surface of the disk that defines the area between indentations is substantially coplanar and parallel with the upper surface of the base disk 13.

Support structure 11 provides two similar portions that are essentially mirror images of each other, each having vertically oriented support columns 18 carrying horizontally extending support arms 19. The support columns illustrated are formed by rolling the end portion 20 of the associated support arm back upon itself and interconnecting the base portion of the adjacent column elements by support foot 21. The only requirement of the support columns is that they be sufficiently rigid to support the upstanding support arms and maintain their configurational integrity, so the structure may take various other forms such as that of a post, vertical beam or the like and remain within the ambit of my invention. The choice of the structure illustrated was made for manufacturing convenience and to create somewhat of a handle structure between the opposed support columns which may be used to aid holding or manual manipulation of the support device.

Figure 5:
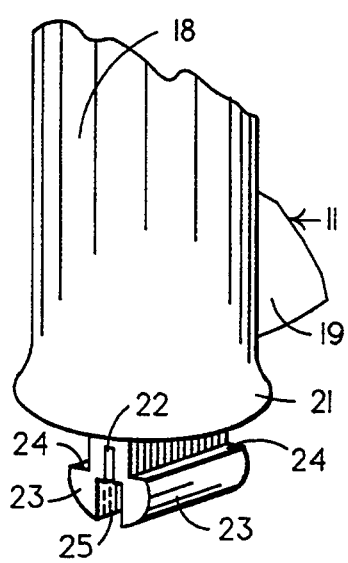
FIG. 5 is an enlarged isometric view of the foot and connector structure of one of the vertical columns of the holder of FIG. 1.

As seen especially in FIGS. 5 and 6, support foot 21 defined by each support column structurally supports a depending support foot fastener providing rectilinear shank 22 carrying enlarged fastening protuberance 23 in its lower portion, with a horizontal fastening ledge 24 defined on each side and relief groove 25 defined in the lower medial portion. These elements are so configured and dimensioned that the support foot fastener fits and is carried within fastening hole 14 when support foot 21 rests on the upper surface of the base disk. The fastening foot is formed of resiliently deformable material so that it may be placed by manually manipulating the structure to deform it sufficiently to allow fastening protuberance 23 to pass into fastening hole 14 and past the narrower upper portion of that hole to fasten the fastener structure therein upon returning to its original shape by reason of its retentive memory. This fastening generally may be of a releasable nature, depending upon the physical parameters and configurational limitations of the materials involved, and requires no structures extending below the lower planar surface of the base disk. The exact form of fastening is not critical to my invention and the form illustrated was chosen for convenience of manufacture and assembly.

Support arms 19 are resilient band-like elements extending in an arcuate fashion away from support columns 18 and about more than a diametrical half of the periphery of base disk 13, so that the two opposed support arms overlap in an area diametrically opposite the slot between the support columns. In the species illustrated in FIGS. 1–6, the support arms define an elongate medial window 26 which divides the support arm into upper element 19a, lower element 19b, and solid end portion 19c. The adjacent surfaces of the support arms each carry one element of a hook and loop type fastener 33 for releasable and adjustable attachment of the overlapping end portions of the support arms to each other. This requires that one fastener element be on the inner surface of one support arm and the outer surface of the other arm, but it is not critical which support arm overlaps in an inner or outer position or which fastener element is carried by either arm.

The support arms 19 must have some resilient deformability so that they may be configured for securement about containers of differing size and fastened to each other about such containers in a supporting fashion. In general, such deformability is provided by the materials from which the support arms are formed, but it is also aided by the particular configuration of those arms. The window configuration illustrated is not necessary, but it does remove medial material from the arms that otherwise would exist in the window area to provide less overall cross-sectional area for the arm and increase its deformability. The arms also may be formed with an outward taper (not illustrated) to provide less cross-sectional area in the outer portions of the arms to increase their deformability in that area.

Holding structure 12, as seen particularly in FIG. 2, provides alternative methods of positionally maintaining my holder on a somewhat horizontal surface of a vehicle by fastening the holder to a rigid surface by means of fabric hook and loop type fasteners or by fastening it to a carpeted surface by means of carpet hook fasteners.

Fabric hook and loop type fastening means provides a plurality of patches 27 comprising two separable but releasably fastenable portions. The first portion of such material is fastened to the undersurface of the lowermost coplanar portion of base disk 13. The second complimentary portion of such material, which is configurationally similar to the first portion, is coated on its external surface with an adhesive that will adhere to smoother rigid material, and that adhesive coated surface is covered with a membrane to prevent adhesion until the protective membrane is removed. Such type of fasteners are not novel and are known in the present day marketplace for maintaining smaller objects on the surface of support structures, so the details of this fastener are not illustrated or described.

My carpet hook fastener is illustrated particularly in FIG. 2. This fastener provides a plurality of similar carpet hooks, each having shank 28 defining fastening eye 29 at its inner end and "U" shaped hook portion 30 terminating in sharpened point 30a at its outer portion. Paired cooperating carpet hook holes 31 defined in bridges 17 are so sized and arrayed as to receive the opposed legs of the "U" shaped portion 30 of each hook substantially as illustrated, with the hooks arrayed in a radial orientation as illustrated. The inner eye portions 29 of all carpet hooks are joined by an elastomeric band 32 so that if any hook moves radially outwardly from its illustrated relaxed position resting in hook holes 31, it will create elastic tension in band 32 and will have to be moved outwardly against this bias of this band. With such structure, the overall bias will tend to increase proportionately with both the number of hooks moved and the amount of their motion. As the hooks are moved radially outwardly and after "U" shaped portions 30 are radially outwardly of their associated hook holes 31, the hooks may be rotated about the shank 28 to aid hooking in the nap of a carpet spacedly adjacent the periphery of base disks 13.

The dimensioning and materials from which my holder is formed may vary but do have certain requirements for functionality. The diameter of base disk 13 should be sufficient to support containers of desired size. The container supported may be somewhat larger than the diameter of the base disk, if the support arms are long enough to encircle it and fastenably interconnect with each other. Support, however, becomes more and more difficult if a supported container is much larger than base disk. The vertical extent of the support arms must also be sufficient to accomplish the degree of support required, as the greater the vertical extension the more secure the support of a container will be, at least until the support arms extend to the top of the supportable portion of a container. With normally sized cups and beverage cans, the diameter of the base disk ranges between approximately three to six inches and the height of the support arms above the, base disk ranges between two and six inches, though variances outside the stated ranges are within the scope of my invention.

A second species of my holder illustrated in FIGS. 7–13, comprises essentially the same base 110, upstanding support structure 111 and holding structure 112 as the first species.

Base 110 provides base disk 113 defining fastening holes 114 to receive elements of the support structure. The lower surface of the base defines medial indentations 115 to receive carpet hooks 30 of the support elements and peripheral segmental indentations 116 within which the bends of the carpet hooks are carried. Additional quadrantal indentations 117 are defined to conserve material in the base structure. Paired cooperating rug hook channels 118 are defined in bridges 119 between the medial and segmental indentations. The undersurface of base disk 113 is coplanar and provides a plurality of fastener tabs 120 forming one element of the snap fasteners that releasably fasten a bottom element. The upper surface of base disk 113 provides upstanding column supports 121 having the same external configuration as a column to be supported and defining an internal channel 122 to receive a mating tenon portion of the lower part of a support column to aid the support of that column.

Bottom 123, as illustrated in FIG. 11, is a planar element that covers the lower surface of the base disk. The bottom 123 defines a plurality of upwardly extending snap fasteners 124 to engage fastener tabs 120 for positional maintenance of the bottom on the body disk. In the instance illustrated, bottom 123 has the same configuration as the opening defined in the lower surface of the bottom disk and fits immediately within that opening, though both the bottom and lower portion of the base disk may have various other configurations that allow a releasably interconnecting relationship and those other configurations ere within the scope of my invention.

Support structure 111 provides vertical columns 125, each having angulated buttress elements 126 to aid their stability and rigidity. The lower portion of each column defines a tenon 127 to fit within the medial channel 122 of column supports 121, with a fastening protuberance 128 substantially similar to the fastening protuberance of the first species extending downwardly below the tenon portion to releasably fasten each column in a column support and to the base disk.

The uppermost portion of each column structurally carries an arcuate support arm 129 so configured and arrayed that the outer end portions of the two support arms will overlap as in the first species of my holder. The support arm 129a is of substantially rectilinear cross-section, and the support arm 129b has substantially the same cross-sectional size, but defines in its upper edge a plurality of teeth 130 that are of an angulated nature, sloping toward the column supporting that arm. The support arms of the second species have substantially less vertical extent than those of the first species and are easier and more economical of manufacture, though by reason of their positioning, so that they contact the upper portion of a beverage container, they still stabilize and maintain that container similarly to the first species.

The releasable means for fastening the end portions of the support arms to each other differ from those of the first species. Support arm 129b carries "C" shaped end clamp 131 defining opening 132 communicating with medial channel 133, both configured to allow the positioning of the medial portion of support arm 129a through opening 132 and into medial channel 133 where it may be positionally maintained. The back portion of "C" clamp 131 is substantially coplanar and continuous with the end portion of the support arm 129b.

The outer end portion of support arm 129a defines fastening clamp 134 positioned in substantially the same relationship to the end portion of that support arm. The back of clamp 134 is somewhat larger that that of clamp 131 and defines medial orifice 135 to accept the end portion of fastening structure 136, 137. This fastening structure provides elongate resilient arm 136, structurally carried by the upper portion of the back of clamp 134 immediately above orifice 135. The arm 136 carries in its end part fastening structure 137 seen in FIG. 10 to define in its end part depending teeth 138 to matingly engage the angulated teeth 130 defined in the upper surface of support arm 129b. With this structure fastening arm 136 is bent upon itself, as shown in FIG. 7, and its fastening structure 137 is extended through vertical slot 135 and into medial channel 133 to there fastenably communicate with the upper surface of support arm 129b. If it be desired to release the fastenable interconnection of the bent fastening arm 136, the arm is manually moved upwardly until teeth 138 of fastener 137 are disengaged from teeth 130 of the other arm and the two support arms may then be moved relative to each other.

Holding structure 112 of the second species of holder is substantially the same as the holding structure 12 of the first species and provides the same elements that operate in the same fashion.

The material from which the disk base is formed must be reasonably rigid and that from which the support arms are formed must be sufficiently resilient to perform the specified functions. The preferred material for both elements is some type of polymeric or resinous plastic that provides the desired physical characteristics and yet is amenable to ordinary manufacturing processes of an economic nature. It is to be noted that the support arms could be formed from material as flexible as fabric and this is within the scope of my invention.

Having thusly described the structure of my holder, its use may be understood.

Firstly, a holder is formed as illustrated and specified. The holder is assembled by manually manipulating the upstanding support structure so that the fastening feet depending from the support columns pass into holes defined in base disk 13 therefore and become fastenably engaged therein, with the support arms extending horizontally from the support columns in an overlapping fashion. The hook fastening structure is established on the undersurface of base disk as specified. It should be noted that with hook structure in the form illustrated the "U" shaped portion of a hook and the size and positioning of hook holes 31 is such that a hook may be positioned in the device after hook formation.

After the bolder is assembled it is positioned on a somewhat horizontal surface of a vehicle, commonly some portion of the floor, dashboard, or center console, and there maintained by means of one of the fastening structures described. If the holder is to be positioned on a rigid surface such as a dashboard or uncarpeted center console, it will be positionally maintained by the hook and loop type fasteners. To accomplish this, the protective membrane is removed from each of the adhesive surfaces of the outer hook and loop fastener elements and my holder is then placed on the rigid surface in a position here it is to be maintained. After such placement, and with appropriate manual pressure if required, the adhesive coating of the outer hook and loop fastener elements are adhered to the adjacent underlying supportive surface and the holder is then releasably fastened thereto. The holder may be released by manual manipulation causing the associated hook and loop fastening elements to release their fastening relationship, and it may be re-established by replacing the fastening elements in their adjacent fastening mode.

To use the carpet fastening structure the holder is positioned on s somewhat horizontal carpeted surface where it is to be maintained. Each carpet hook in turn is manually manipulated to move radially outwardly from the holder so that the hook point 30a becomes disengaged from its associated supporting hook hole 31 and the hook is then rotated as necessary to engage the point 30a in the nap of an underlying carpeted surface. The hook is then pushed into the carpet while the holder is positionally maintained. The bias created in the hook by elastomeric band 32 will cause the hook to engage and become fastened in the carpet. The process is then repeated with each of the other hooks until all are engaged in the carpet adjacent the periphery of base 10 when the holder will be releasably positionally maintained. It is to be particularly noted for this type of holding structure that forces on each carpet hook will be somewhat similar and all will be directed toward the medial portion of base 10, so that the holder is supported in a somewhat symmetrical fashion and forces tending to dislodge such support will tend to be somewhat equally absorbed by each carpet hook because of their array and interconnection.

After the holder is positioned in a vehicle it is in a condition to receive and support a beverage container. Most containers to be supported are either of a cylindrical nature, such as bottle and can type containers in the form of circular cylinders, truncated conics, or at least surfaces of revolution, or have a cylindrical body with a normally extending handle structure to aid grasping by a user. My holder generally operates equally well and in substantially the same fashion with either type of container.

For use, a container is positioned with its bottom resting on the upper surface of the base disk and its handle, if any, extending through the space between support columns 18, or else normally outwardly above the support arms if the handle is in such vertical position as to allow this. After such placement of a beverage container, the support arms are disconnected from each other by appropriate manual manipulation separating the fastener elements communicating therebetween. The support arms are then each moved to a position encircling the adjacent portion of the beverage container to be held, while maintaining the fasteners in a spaced disengaged relationship. When the support arms are thusly positioned, the fasteners carried by the adjacent surfaces of the support arms are moved into fastening engagement so that the support arms provide an encircling support for the beverage container to be supported. This fastening engagement of the support arms may be as tight as necessary to accomplish the desired support, but if it be too tight, it may be necessary to disengage the overlapping portions of the support arms from each other to remove the beverage container for use. If the support be looser, a container may be moved vertically upwardly and out of encircling containment by the support arms and replaced in a supporting relationship by reverse manipulation.

The foregoing description of my invention is necessarily of a detailed nature so that a specific embodiment of its best known mode might be set forth, but it is to be understood that various modifications of detail, rearrangement and multiplication of parts might be resorted to without departing from its spirit, essence or scope.

Having thusly described my invention, what I desire to protect by Letters Patent, and

What I claim is:

1. A beverage container holder for releasable attachment on an interior surface of a vehicle to support and positionally maintain variably sized beverage containers, comprising in combination:
   a rigid flat base disk having means on its undersurface for releasable attachment on a somewhat horizontal interior surface of a vehicle; and
   upstanding support structure releasably carried by the base disk comprising two similar support members defining spacedly adjacent, upstanding support columns defining a channel therebetween, each support column having a flexible support arm extending horizontally therefrom to overlap with the other support arm in an area substantially diametrically opposed to the space between support columns, each adjacent overlapping portion of the support arms carrying one element of a fastener for adjustable and releasable fastening of the overlapping portions of the support arms to each other.

2. The beverage container holder of claim 1 wherein each vertical support column is releasably fastened to the rigid base disk by a resiliently deformable fastening foot depending from the column and extending into a hole defined in the base disk.

3. The beverage container holder of claim 1 wherein the fastener for fastening overlapping portions of the support arms comprises
   at least one hook and loop type fastener having one portion of the fastener carried by each adjacent surface of the support arms.

4. The beverage container holder of claim 1 wherein the fastener for fastening overlapping portions of the support arms comprises
   a first support arm having an upper surface defining plural spaced teeth and carrying in its outer end a "C" shaped end clamp with a medial channel to slidably receive the second support arm and an opening communicating with the medial channel to allow placement of second support arm in the medial channel, and
   the second support arm carrying in its outer end a fastening clamp with a medial channel to receive the first support arm and an opening communicating with the medial channel to allow placement of the first support arm therein, said fastening clamp defining a medial orifice and carrying an elongate fastening arm with fastening structure in its outer end to extend through the medial orifice and operatively engage the teeth defined in the first support arm to releasably fasten the support arms relative to each other.

5. The invention of claim 1 wherein the means for releasable attachment carried by the base for positional maintenance comprises:
   a plurality of hook and loop type fastening patches having one element fastened to the base disk and the other element carrying adhesive on its outer surface for fastening to a smooth rigid supporting surface of a vehicle.

6. The invention of claim 1 wherein the means carried by the base disk for positional maintenance comprises:
   a plurality of carpet hooks carried in the base disk for extension therefrom in a radial direction, all said carpet hooks being interconnected in their radially inner portions by an elastomeric band to bias all carpet hooks to a radially inward position, but allow radial extension by manual manipulation outwardly against their bias to fastenably engage carpet spacedly adjacent the base disk.

7. A beverage container holder for releasable attachment on a substantially horizontal interior surface of a vehicle to support and positionally maintain variably sized beverage containers, comprising, in combination:

a flat base disk having means on its undersurface for releasable attachment on a somewhat horizontal interior surface in a vehicle, said means comprising a plurality of hook and loop fastening patches having one element fastened to the lower surface of the disk base and the other element carrying adhesive on its outer exposed surface for optional fastening to a surface of a vehicle interior, and, a plurality of symmetrically arrayed carpet hooks carried in the base disk for extension in a radial direction, all of said hooks being interconnected in their radially inner portions by an elastomeric band to bias all hooks to a radially inward position but allow outward radial extension by manual manipulation against their bias to fastenably engage a carpet spacedly adjacent the base disk; and upstanding support structure releasably carried by the base disk comprising two similar members each having spacedly adjacent, vertical support columns defining a channel therebetween, each support column being releasably fastened to the base by a resiliently deformable fastening foot depending from the column and extending into a hole defined in the base disk and having a horizontal flexible support arm extending horizontally from each support column to overlap in an area diametrically opposed to the space between the support columns, each overlapping portion of the support arms carrying one element of a hook and loop type fastener for adjustable and releasable fastening of the overlapping portions of the support arms to each other.

8. A beverage container holder for releasable attachment on a substantially horizontal interior surface of a vehicle to support and positionally maintain variably sized beverage containers, comprising in combination:

a flat base disk having means on its undersurface for releasable attachment and positional maintenance on a somewhat horizontal interior surface in a vehicle, said means comprising a plurality of hook and loop fastening patches having one element fastened to the lower surface of the disk base and the other element carrying adhesive on its outer exposed surface for optional fastening to a surface of a vehicle interior, and a plurality of symmetrically arrayed carpet hooks carried in the base disk for extension in a radial direction, all of said hooks being interconnected in their radially inner portions by an elastomeric band to bias all hooks to a radially inward position but allow outward radial extension by manual manipulation against their bias to fastenably engage a carpet spacedly adjacent the base disk; and upstanding support structure releasably carried by the base disk comprising two similar members each having spacedly adjacent, vertical support columns defining a channel therebetween, each support column being releasably fastened to the base by a resiliently deformable fastening foot depending from the column and extending into a hole defined in the base disk and interconnecting a horizontal flexible support arm extending horizontally from each support column to overlap in an area diametrically opposed to the spaced between the support columns, a first support arm having an upper surface defining plural spaced teeth and carrying in its outer end a "C" shaped end clamp with a medial channel to slidably receive the second support arm and an opening communicating with the medial channel to allow placement of the second support arm in the medial channel, and the second, support arm carrying in its outer end a fastening clamp with a medial channel to receive the first support arm and an opening communicating with the medial channel to allow placement of the first support arm therein, said fastening clamp defining a medial orifice and carrying an elongate fastening arm with fastening structure in its outer end to extend through the medial orifice and operatively engage the teeth defined in the first support arm to releasably fasten the support arms relative to each other.

* * * * *